United States Patent [19]

Langer

[11] 4,219,456
[45] Aug. 26, 1980

[54] FLAME RETARDANT AGENT SOLUTION OF PHOSPHORIC ACID CONTAINING CONDENSATE OF GUANIDINE AND FORMALDEHYDE COMPATIBLE WITH FORMALDEHYDE RESIN SOLUTIONS

[75] Inventor: Manfred Langer, Karlstein, Fed. Rep. of Germany

[73] Assignee: Deutsche Gold- und Silber Scheideanstalt Vormals Roessler, Frankfurt, Fed. Rep. of Germany

[21] Appl. No.: 962,486

[22] Filed: Nov. 20, 1978

[30] Foreign Application Priority Data

Dec. 21, 1977 [DE] Fed. Rep. of Germany ....... 2756973

[51] Int. Cl.² ............................ C08K 5/05; C08K 5/13; C08L 61/20
[52] U.S. Cl. ............................... 260/33.4 R; 528/268; 106/18.14; 252/8.1
[58] Field of Search .................. 528/244, 266, 268; 260/29.2 R, 29.3, 29.4 R, 33.4 R; 106/18.14; 252/8.1

[56] References Cited

U.S. PATENT DOCUMENTS

| | | | |
|---|---|---|---|
| 3,864,076 | 2/1975 | Nachbur et al. | 252/8.1 |
| 3,958,061 | 5/1976 | Singer et al. | 106/18.14 |
| 3,969,291 | 7/1976 | Zukuba et al. | 260/29.2 R |
| 4,095,945 | 6/1978 | Umetoni et al. | 106/18.14 |

FOREIGN PATENT DOCUMENTS 657599  9/1951  United Kingdom ..................... 528/244

Primary Examiner—Joseph L. Schofer
Assistant Examiner—Peter F. Kulkosky
Attorney, Agent, or Firm—Cushman, Darby & Cushman

[57] ABSTRACT

A formaldehyde resin solution compatible fire retardant agent solution compatible with formaldehyde resin solutions is prepared consisting essentially of (a) 30 to 75 weight percent of a phosphoric acid containing condensation product of guanidine and formaldehyde in which the molar ratio A of phosphoric acid to guanidine is between 0.7:1 and 1.5:1 and the molar ratio B of formaldehyde to guanidine is between 1.0:1 and 4.0:1 and in which additionally the product of the two molar ratios A and B is from 1.0 to 6.0, and (b) 70 to 25 weight percent of a saturated, straight chain monohydric alcohol having 1 to 3 carbon atoms or a mixture of such an alcohol and up to 25 weight percent, based on the weight of component (b) of water.

9 Claims, No Drawings

FLAME RETARDANT AGENT SOLUTION OF PHOSPHORIC ACID CONTAINING CONDENSATE OF GUANIDINE AND FORMALDEHYDE COMPATIBLE WITH FORMALDEHYDE RESIN SOLUTIONS

BACKGROUND OF THE INVENTION

Formaldehyde resins, which for example are employed as impregnating solutions, are frequently not burnable or only poorly burnable themselves. Nevertheless, for many uses it is desirable that they be provided additionally with a fire retardant so that the substrate treated with the formaldehyde resin solution is made non-combustible.

Known fire retardants, which generally have a high content of nitrogen and phosphorus or their aqueous solutions have the disadvantage that they are not compatible with formaldehyde resin solutions, for example, novolaks dissolved in methanol.

SUMMARY OF THE INVENTION

The object of the invention is the development of a fire retardant solution compatible with formaldehyde resin solutions. The fire retardant solution of the invention consists essentially of (a) 30 to 75 weight percent of a phosphoric acid containing condensation product of guanidine and formaldehyde in which the molar ratio A of phosphoric acid to guanidine is between 0.7:1 and 1.5:1 and the molar ratio B of formaldehyde to guanidine is between 1.0:1 and 4.0:1 and in which additionally the product of the two molar ratios A and B is from 1.0 to 6.0, and (b) 70 to 25 weight percent of a saturated, straight chain monohydric alcohol having 1 to 3 carbon atoms or a mixture of such an alcohol and up to 25 weight percent, based on the weight of component (b) of water.

The fire retardant solutions are mixable and compatible with all customary formaldehyde resin solutions, be they aqueous or alcoholic solutions.

The true flame retardant agent is a phoshoric acid containing condensation product of guanidine and formaldehyde. In order to guarantee a sufficient fire retardant action on the one hand and the solubility in lower alcohols and connected therewith the compatibility with the customary formaldehyde resin solutions on the other hand, the maintaining of the specific molar ratios between the individual components of the condensation product is unconditionally necessary. Thus the ratio between the number of moles of the phosphoric acid and the number of moles of guanidine (molar ratio A) is between 0.7:1 and 1.5:1, preferably between 0.75:1 and 1.1:1. Likewise, the ratio between the number of moles of formaldhyde and the number of moles of guanidine (molar ratio B) must be between 1.0:1 and 4.0:1, preferably between 1.5:1 and 3.0:1. Finally, there is the limitation that the product of the two molar ratios A and B must be between 1.0 to 6.0, preferably 1.3 to 3.3. The condensation product constitutes 30 to 75 weight percent, preferably 40 to 60 weight percent of the total fire retardant agent solution.

The condensation product is present in the form of an alcoholic or aqueous alcoholic solution. Specifically the fire retardant solution of the invention contains 70 to 25 weight percent, preferably 60 to 40 weight percent of an unbranched alkanol with 1 to 3 carbon atoms or a mixture of such alkanols or a mixture of at least 75 weight percent of such an alkanol with at most 25 weight percent of water. The preferred alkanols are methanol and ethanol. There can also be used n-propanol.

It would be possible of course at corresponding expense to produce practically water-free agents. In practice, however, a smaller or larger amount of water is brought into the agent through the raw materials used in the production depending on the procedure.

The fire retardant agent solutions of the invention are produced in such way that the condensation reaction is carried out in the lower alcohols mentioned. This can, for example, be done by mixing an alcoholic formaldehyde solution, produced by dissolving paraformaldehyde in the alcohol in question in the presence of a slight amount of a base (e.g., sodium hydroxide or potassium hydroxide), and an alcoholic suspension of guanidine phosphate, produced by reacting an alcoholic suspension of guanidine carbonate, with phosphoric acid and heating the mixture to boiling until a clear solution is formed and the "free formaldehyde" content detectable analytically by the bisulfite method is reduced to about 5 weight percent (or less). Another possibility is to add crystalline guanidine dihydrogen phosphate or a mixture of crystalline guanidine dihydrogen phosphate and crystalline diguanidine hydrogen phosphate portion wise to a boiling alcoholic formaldehyde solution. In this case, the finished agent has a particularly low water content. If a higher water content of the finished agent is practicable, then it is industrially more advantageous if the guanidine phosphate is produced in situ by neutralization of the guanidine carbonate with phosphoric acid and the still hot, concentrated solution is added in portions to the alcoholic formaldehyde solution.

The fire retardant agent solutions of the invention are well suited for making fire resistant water or alcohol soluble formaldehyde resin solutions such as of ureaformaldehyde resins, melamine-formaldehyde resins, resoles (e.g., phenol-formaldehyde resoles) and novolaks (e.g. phenol-formaldehyde novolaks) with which they are more compatible than comparable aqueous fire retardant agent solutions. The fire retardant agent solutions are mixed with the above-mentioned resin solutions which are dissolved in water or an alcohol, to form an emulsion or a clear solution.

The tire retardant agent solutions of the invention are particularly well suited for making fire resistant phenol resins (e.g., phenol formaldehyde resins), namely, both novolaks solutions and also resole solutions. Furthermore, for example, paper and textiles for the most different areas of use can be impregnated with the thus equipped impregnating resins as a result of which the thus treated substrate is made fire resistant.

As particularly advantageous with the thus equipped impregnating resins there is to be observed that the guanidine phosphate-formaldehyde condensate can be incorporated into the formaldehyde-impregnating resin during the hardening without it leading to a substantial deterioration of the mechanical properties of the treated substrate as is observed in the use of heterogeneously dispersed solids.

On the other hand, there are also avoided the disadvantages of fire retardants containing bromo-organic compounds, especially the formation of highly toxic and strongly corrosive pyrolytic products in the case of fire.

According to the type of impregnating resin and purpose of use of the impregnating resin the impregnating resin is mixed with different amounts of the fire retardant agent solutions of the invention. If substrates such as textile or paper webs are impregnated with higher impregnating resin uptake (about 100%) then a content of the finished fire resistant impregnating resin of 25 to 40 weight percent (based on dry material) is sufficient in order to obtain diminished inflammability or noncombustibility of the treated substrate.

The fire retardant agent solution can be mixed with the impregnating resin shortly before the processing. However, it can also be mixed with the impregnating resin directly after the production and be stored in this form. The latter process has, for example, the advantage that even more highly concentrated fire retardant agent solutions, which allow more economical production, can be produced, which apart are not storage stable and are inclined to crystallize out, but which in combination with the impregnating resin are stable for a sufficient time. In this connection as sufficient storage stability there can be considered a stability of a month or more.

Fire retardant agent solutions of the invention with a solids content of 30 to 60 weight percent in any case are storage stable over a long period of time. With the concentrated solutions up to a solids content of 75 weight percent, however, it is more suitable to mix them with the impregnating resin to be equipped therewith shortly after the production.

The preparation of different fire retardant agent solutions according to the invention is explained further in examples 1 to 13. All percentages in all cases use weight percents.

The compositions can comprise and consist essentially of or consist of the materials set forth.

DESCRIPTION OF THE PREFERRED EMBODIMENTS

EXAMPLE 1

379 grams of 95% paraformaldehyde (12 moles) with the addition of 2 grams of sodium hydroxide were added to 341 grams of methanol and dissolved with heating. Then there were added 628 grams of guanidine dihydrogen phosphate (molar ratio guanidine to phosphoric acid 1:1) and a further 628 grams of methanol; the mixture was heated at reflux until the formation of a clear solution, about 2½ hours. Then there were added a further 628 grams of guanidine dihydrogen phosphate and 628 grams of methanol. After a further 2½ hours heating the salt dissolved. After a further three hours at reflux the reaction was completed and the solution drawn off. It contained 50% solids, 49.4% methanol and 0.6% water.

EXAMPLE 2

379 grams of 95% paraformaldehyde (12 moles) were dissolved in the heat in 1,329 grams of methanol with the addition of 2 grams of sodium hydroxide. In a second reaction vessel there were reacted 490 grams of 80% phosphoric acid (4 moles) with 360 grams of guanidine carbonate (2 moles). The hot guanidine dihydrogen phosphate solution formed was added to the formaldehyde solution and boiled at reflux until the formation of a clear solution. After about 2½ hours there was added the same amount of a likewise prepared guanidine dihydrogen phosphate solution to the reaction mixture. The mixture was boiled at reflux for a further three hours, cooled and drawn off. It contained 50% solids, 41.1% methanol and 8.9% water.

EXAMPLE 3

189 grams of paraformaldehyde (6 moles) were dissolved in 335 grams of methanol with 1 gram of NaOH and boiled at reflux with 314 grams of guanidine dihydrogen phosphate (2 moles) until formation of a clear solution, about 1¼ hours. Then there were added a further 314 grams (2 moles) of guanidine dihydrogen phosphate and boiling at reflux continued for a further 3½ hours. The solution formed contained 69.9% of solids, 29.6% methanol and 0.8% water. After allowing the solution to stand for 8 days at room temperature a portion of the solids crystallized out.

EXAMPLE 4

189 grams of paraformaldehyde (6 moles) were dissolved in the heat in 298 grams of methanol with 1 gram of sodium hydroxide. Then there were added 2 moles of a hot, concentrated guanidine dihydrogen phosphate solution, which was previously produced from 180 grams of guanidine carbonate (1 mole) and 231 grams of 85% phosphoric acid (2 moles). After about one hour of boiling at reflux there was formed a clear solution to which there were added a further 2 moles of the previously described concentrated guanidine dihydrogen phosphate solution as well as 137 grams of methanol. The mixture was boiled at reflux for a further three hours, cooled and drawn off. It contained 60% solids, 31.5% methanol and 8.5% water.

EXAMPLE 5

189 grams of paraformaldehyde (6 moles) were dissolved in 694 grams of methanol in the heat with 1 gram of sodium hydroxide. The mixture was heated to boiling. Then in intervals in each case of 1½ hours there were added 5 portions of a hot solution of, in each case, 0.8 mole of guanidine dihydrogen phosphate (produced from 85% phosphoric acid and guanidine carbonate) under continuous boiling of the mixture. After a total of 7½ hours the mixture was cooled and drawn off. It contained 50% solids, 42.9% methanol and 7.1% water.

EXAMPLE 6

189 grams of paraformaldehyde (6 moles) were dissolved in the heat in 180 grams of methanol with 1 gram of sodium hydroxide. Then there were added 314 grams guanidine dihydrogen phosphate (2 moles). After boiling for one half hour at reflux a clear solution was formed. There were added a further 314 grams of guanidine dihydrogen phosphate and 125 grams of methanol. the mixture was boiled at reflux for a further four hours, cooled and drawn off. It contained 72% solids, 27.2% methanol and 0.8% water.

EXAMPLE 7

252 grams of 95% paraformaldehyde (8 moles) together with 1.2 grams of sodium hydroxide were dissolved in the heat in 500 grams of methanol. There were added thereto 343 grams of a hot guanidine phosphate solution which was produced previously from 180 grams of guanidine carbonate (1 mole) and 207 grams of 85% phosphoric acid (1.8 moles). After one hour of boiling at reflux the solution became clear and there were added a further 343 grams of a guanidine phosphate solution as previously described as well as 230 grams of methanol. After a total of 6½ hours boiling at reflux the reaction was finished and the product drawn off. It contained 49.8% solids, 43.8% methanol and 6.4% water.

EXAMPLE 8

189 grams of paraformaldehyde (6 moles) were dissolved in the heat in 450 grams of methanol under the addition of 1 gram of sodium hydroxide. After addition of 390 grams of a hot guanidine phosphate solution, which had been previously produced from 180 grams of guanidine carbonate (1 mole) and 254 grams of 85% phosphoric acid (2.2 moles), the mixture was boiled at reflux for about one hour until a clear solution was obtained. Then there were added a further 250 grams of methanol as well as a further 434 grams of the above mentioned guanidine phosphate solution after which the mixture was heated at reflux for a further 4½ hours. The solution formed contained 51.1% solids, 42.2% methanol and 6.7% water.

EXAMPLE 9

Example 7 was repeated but altogether there were added only 3 moles of 85% phosphoric acid. The total reaction time was 7 hours. The solution formed contained 50% solids, 43.5% methanol and 6.5% water.

EXAMPLE 10

Example 7 was repeated but there were used only 6 moles of formaldehyde and the total amount of methanol amounted to 660 grams. After a reaction time of 7½ hours there was formed a clear solution containing 50.2% solids, 42.9% methanol and 6.9% water.

EXAMPLE 11

1263 grams of 95% paraformaldehyde (40 moles) were dissolved in 2970 grams of methanol with heating together with 6 grams of NaOH. There were added thereto in two equal portions in an interval of 2 hours 2566 grams of a hot, concentrated solution of guanidine dihydrogen phosphate, which was produced from 1260 grams of guanidine carbonate (7 moles) and 1614 grams of 85% phosphoric acid (14 moles). Subsequently the mixture was heated at reflux for a further 2 hours. The solution formed contained 50% solids, 43.7% methanol and 6.3% water.

EXAMPLE 12

189 grams of 95% paraformaldehyde (6 moles) were dissolved in the heat in 1000 grams of methanol with addition of 1 gram of sodium hydroxide and the mixture heated to reflux. Then in an interval of 1 hour there were added in 3 equal portions 1098 grams of a hot guanidine dihydrogen phosphate solution, which previously was produced from 540 grams of guanidine carbonate (3 moles) and 692 grams of 85% phosphoric acid (6 moles). After the end of the last addition, the mixture was heated for a further 3 hours at reflux, then cooled and drawn off. The solution contained 49.0% solids, 43.7% methanol and 7.3% water.

EXAMPLE 13

189 grams of 95% paraformaldehyde were dissolved in the heat in 700 grams of ethanol together with 1 gram of sodium hydroxide and heated to reflux. Then in an interval of 3 hours there were added in two equal parts 732 grams of a hot guanidine dihydrogen phosphate solution which had been previously produced from 360 grams of guanidine carbonate (2 moles) and 461 grams of 85% phosphoric acid (4 moles). After the second addition the mixture was heated at reflux for a further 5 hours, then allowed to cool and drawn off. The product corresponds in the molar ratios to those of Examples 5, is dilutable in ethanol and has the composition, solids 49.7%, ethanol 43.2% and water 7.1%.

In following Examples 14 to 16 the use and effect of the fire retardant agent solutions of the invention is elucidated. The percentages again in all cases are weight percents.

EXAMPLE 14

100 grams of a 70 weight percent novolak solution in methanol (water content 1.5%) were mixed with 60 grams of the fire retardant agent solution produced in Example 5, treated with 5 grams of hexamethylenetetramine and diluted with 420 grams of methanol to a solid content of about 18%. Filter paper strips (70 g/m$^2$ filter paper) having a width of 1 cm and length of 20 cm were dipped in the solution for 1 minute, allowed to drain and then heated to 110° C. for 10 minutes. The increase in weight (based on the dry material) was 35%.

EXAMPLE 15

85 grams of the novolak solution were mixed with 80 grams of the flame retardant agent solution prepared in Example 5, treated with 4 grams of hexamethylenetetramine and diluted with 520 ml of methanol to a solids content of about 18%. Filter paper strips were treated with this mixture as in Example 14. Weight increase: 45%.

EXAMPLE 16

71.4 grams of the novolak solution were mixed with 100 grams of the fire retardant agent solution produced according to Example 5, treated with 3 grams of hexamethylenetetramine and diluted with 397 grams of methanol to a solids content of about 18%. Filter paper strips were treated with this mixture as in Example 14. Weight increase: 43%.

FLAME TESTS

The filter paper strips were fastened horizontally in a burning chamber shielded from air currents and inclined about 45°. One end was flamed 5 seconds with the tip of a 15 cm long non-luminous bunsen burner flame (natural gas). During the flaming and after removal of the source of ignition the following burning properties were observed.

SAMPLE FROM EXAMPLE 14

Burned in the flame, but extinguished 4 seconds after removal of the source of ignition.

SAMPLE FROM EXAMPLE 15

Burned weakly in the flame and extinguished within one second after removal of the source of ignition.

SAMPLE FROM EXAMPLE 16

In the flame was immediately brought to weak combustion, but extinguished instantaneously upon removal of the source of ignition.

What is claimed is:

1. A flame retardant agent solution compatible with a formaldehyde resin solution and consisting essentially of:
    (a) 30 to 75 weight percent of a phosphoric acid containing condensation product obtained by condensation under basic conditions with heating in the presence of a saturated straight chain monohydric alcohol having 1 to 3 carbon atoms of guanidine and formaldehyde in which the molar ratio A of phosphoric acid to guanidine is between 0.7:1 and 1.5:1 and the molar ration B of formaldehyde to guanidine is between 1.0:1 and 4.0:1 and in which additionally the product of the two molar ratios A and B is from 1.0 to 6.0, and (b) 70 to 25 weight percent of a saturated, straight chain monohydric alcohol having 1 to 3 carbons atoms or a mixture of such an alcohol and up to 25 weight percent, based on the weight of component (b) of water.

2. A flame retardant solution according to claim 1 wherein the alcohol is methanol.

3. A flame retardant agent solution according to claim 1 wherein molar ratio A is from 0.75:1 to 1.1:1, molar ratio B is from 1.5:1 to 3.0:1 and the product of the two molar ratios is from 1.3 to 3.3.

4. A flame retardant composition according to claim 1 wherein the condensation product is 30 to 75% of the total flame retardant agent solution.

5. A flame retardant composition according to claim 4 wherein the condensation product is 40 to 60% of the total flame retardant composition.

6. A flame retardant agent composition comprising the product of claim 1 and a formaldehyde resin solution.

7. A flame retardant agent composition according to claim 6 wherein the formaldehyde resin is melamine-formaldehyde, urea-formaldehyde or phenol-formaldehyde.

8. A flame retardant agent composition according to claim 7 wherein the formaldehyde resin is a phenol-formaldehyde resin.

9. A flame retardant agent composition according to claim 7 wherein the phenol-formaldehyde resin is a novolak.

* * * * *